United States Patent
Wright, III et al.

(10) Patent No.: US 12,465,938 B2
(45) Date of Patent: *Nov. 11, 2025

(54) SPRINKLER WITH INTERNAL COMPARTMENTS

(71) Applicant: The Toro Company, Bloomington, MN (US)

(72) Inventors: James T. Wright, III, Riverside, CA (US); Steven C. Renquist, Norco, CA (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,611

(22) Filed: May 16, 2023

(65) Prior Publication Data

US 2023/0286003 A1     Sep. 14, 2023

Related U.S. Application Data

(63) Continuation of application No. 17/450,662, filed on Oct. 12, 2021, now Pat. No. 11,684,939, which is a continuation of application No. 16/742,760, filed on Jan. 14, 2020, now Pat. No. 11,167,304, which is a continuation of application No. 16/407,567, filed on May 9, 2019, now Pat. No. 10,556,248, which is a continuation of application No. 15/982,863, filed on
(Continued)

(51) Int. Cl.
| | | |
|---|---|---|
| *B05B 12/12* | (2006.01) | |
| *A01G 25/00* | (2006.01) | |
| *A01G 25/16* | (2006.01) | |
| *B05B 15/60* | (2018.01) | |
| *B05B 15/70* | (2018.01) | |
| *B05B 15/74* | (2018.01) | |
| *H04W 84/18* | (2009.01) | |

(52) U.S. Cl.
CPC .............. *B05B 12/12* (2013.01); *A01G 25/00* (2013.01); *A01G 25/167* (2013.01); *B05B 15/60* (2018.02); *B05B 15/70* (2018.02); *B05B 15/74* (2018.02); *H04W 84/18* (2013.01)

(58) Field of Classification Search
CPC ......... B05B 12/12; B05B 15/06; B05B 15/10; B05B 15/064; B05B 15/74; B05B 15/60; B05B 15/70; B05B 15/628; A01G 25/00; A01G 25/167; H04W 84/18
USPC ....... 239/237, 204, 200, 201, 203, 205, 206, 239/210
See application file for complete search history.

(56) References Cited

U.S. PATENT DOCUMENTS

| | | |
|---|---|---|
| 121,949 A | 12/1871 | Lessler |
| 3,107,056 A | 10/1963 | Hunter |

(Continued)

*Primary Examiner* — Arthur O. Hall
*Assistant Examiner* — Anna Thi Ho
(74) *Attorney, Agent, or Firm* — Inskeep IP Group, Inc.

(57) ABSTRACT

A sprinkler includes a compartment that surrounds its riser portion in an offset or asymmetrical configuration. More specifically, the distance of the compartments walls from those of the riser vary (i.e., increase or decrease) at different locations surrounding the riser. Put another way, the riser is closer to one side of the compartment than other sides of the compartment. This non-concentric configuration allows larger components to fit inside the compartment than would otherwise fit if the riser was symmetrically surrounded by the compartment.

19 Claims, 16 Drawing Sheets

Related U.S. Application Data

May 17, 2018, now Pat. No. 10,328,444, which is a continuation of application No. 15/352,422, filed on Nov. 15, 2016, now Pat. No. 9,987,649, which is a continuation of application No. 14/280,113, filed on May 16, 2014, now Pat. No. 9,539,602.

(60) Provisional application No. 61/824,212, filed on May 16, 2013.

(56) References Cited

U.S. PATENT DOCUMENTS

| | | | | |
|---|---|---|---|---|
| 3,713,584 | A * | 1/1973 | Hunter | B05B 3/0431 |
| | | | | 239/206 |
| 3,782,638 | A | 1/1974 | Bumpstead | |
| 4,448,353 | A | 5/1984 | Livne | |
| 4,784,325 | A * | 11/1988 | Walker | B05B 15/74 |
| | | | | 239/230 |
| 4,852,802 | A | 8/1989 | Iggulden et al. | |
| 4,913,351 | A | 4/1990 | Costa | |
| 5,222,669 | A * | 6/1993 | Lawson | B05B 15/74 |
| | | | | 239/203 |
| 5,871,156 | A * | 2/1999 | Lawson | B05B 15/74 |
| | | | | 239/206 |
| 5,899,386 | A * | 5/1999 | Miyasato | B05B 15/74 |
| | | | | 239/206 |
| 6,042,021 | A | 3/2000 | Clark | |
| 6,050,502 | A | 4/2000 | Clark | |
| 6,155,493 | A * | 12/2000 | Kearby | B05B 1/3006 |
| | | | | 239/206 |
| 6,186,413 | B1 * | 2/2001 | Lawson | B05B 15/74 |
| | | | | 239/206 |
| 6,199,587 | B1 | 3/2001 | Shlomi et al. | |
| 6,227,455 | B1 | 5/2001 | Scott et al. | |
| 6,336,596 | B1 | 1/2002 | Katzman et al. | |
| 6,402,048 | B1 | 6/2002 | Collins | |
| 6,491,235 | B1 * | 12/2002 | Scott | B05B 3/0422 |
| | | | | 239/206 |
| 6,600,971 | B1 | 7/2003 | Smith et al. | |
| 6,799,732 | B2 | 10/2004 | Sirkin | |
| 6,802,458 | B2 | 10/2004 | Gregory | |
| 6,808,127 | B2 | 10/2004 | Mcnulty et al. | |
| 6,812,826 | B2 | 11/2004 | Buhler et al. | |
| 6,820,825 | B1 | 11/2004 | Wang | |
| 6,827,291 | B2 | 12/2004 | Townsend | |
| 6,854,664 | B2 | 2/2005 | Smith | |
| 7,339,957 | B2 | 3/2008 | Hitt | |
| 7,412,303 | B1 | 8/2008 | Porter et al. | |
| 7,631,813 | B1 | 12/2009 | Lichte et al. | |
| 7,677,469 | B1 * | 3/2010 | Clark | F16H 3/60 |
| | | | | 239/203 |
| 7,926,746 | B2 * | 4/2011 | Melton | B05B 12/006 |
| | | | | 239/206 |
| 8,215,570 | B2 | 7/2012 | Hitt | |
| 8,444,063 | B2 * | 5/2013 | Lichte | G01D 5/142 |
| | | | | 239/203 |
| 8,727,238 | B1 * | 5/2014 | Clark | B05B 3/0431 |
| | | | | 239/206 |
| 8,777,124 | B2 * | 7/2014 | Clark | A01G 25/00 |
| | | | | 239/203 |
| 8,939,384 | B1 * | 1/2015 | Anuskiewicz | B05B 3/0431 |
| | | | | 239/206 |
| 8,955,768 | B1 * | 2/2015 | Clark | B05B 3/0431 |
| | | | | 239/203 |
| 9,169,944 | B1 * | 10/2015 | Dunn | B05B 1/26 |
| 9,302,287 | B2 * | 4/2016 | Dunn | B05B 15/74 |
| 9,314,952 | B2 * | 4/2016 | Walker | B05B 1/267 |
| 9,446,421 | B1 * | 9/2016 | Anuskiewicz | B05B 15/74 |
| 9,539,602 | B2 * | 1/2017 | Wright, III | A01G 25/167 |
| 11,167,304 | B2 | 11/2021 | Wright, III et al. | |
| 2001/0028004 | A1 * | 10/2001 | Kearby | B05B 15/74 |
| | | | | 239/206 |
| 2002/0092924 | A1 * | 7/2002 | Ingham, Jr. | B05B 15/74 |
| | | | | 239/240 |
| 2003/0111549 | A1 | 6/2003 | Mcnulty et al. | |
| 2003/0155433 | A1 * | 8/2003 | Gregory | B05B 1/3026 |
| | | | | 239/203 |
| 2004/0046046 | A1 | 3/2004 | Smith | |
| 2004/0089735 | A1 | 5/2004 | Drechsel | |
| 2004/0181315 | A1 | 9/2004 | Cardinal et al. | |
| 2005/0199842 | A1 | 9/2005 | Parsons et al. | |
| 2006/0049271 | A1 * | 3/2006 | Hitt | A01G 25/167 |
| | | | | 239/69 |
| 2006/0091236 | A1 | 5/2006 | Helzer et al. | |
| 2006/0202051 | A1 | 9/2006 | Parsons et al. | |
| 2007/0007364 | A1 * | 1/2007 | Gregory | B05B 3/0422 |
| | | | | 239/206 |
| 2007/0119965 | A1 * | 5/2007 | Roney | B05B 3/04 |
| | | | | 239/203 |
| 2007/0192486 | A1 | 8/2007 | Wilson et al. | |
| 2007/0221750 | A1 * | 9/2007 | Roberts | B05B 3/12 |
| | | | | 239/69 |
| 2009/0150003 | A1 | 6/2009 | Jordan | |
| 2009/0216345 | A1 | 8/2009 | Christfort | |
| 2010/0044465 | A1 * | 2/2010 | Lichte | B05B 15/70 |
| | | | | 239/203 |
| 2011/0017845 | A1 | 1/2011 | Crist et al. | |
| 2011/0049260 | A1 | 3/2011 | Palmer et al. | |
| 2012/0043395 | A1 | 2/2012 | Hill et al. | |
| 2014/0339333 | A1 | 11/2014 | Wright, III et al. | |
| 2016/0136662 | A1 * | 5/2016 | Clark | B05B 3/0431 |
| | | | | 239/204 |
| 2016/0175858 | A1 * | 6/2016 | Bell | B05B 15/74 |
| | | | | 239/206 |
| 2017/0014838 | A1 | 1/2017 | Clark et al. | |

\* cited by examiner

SPRINKLER WITH INTERNAL COMPARTMENTS

RELATED APPLICATIONS

This application is a continuation of U.S. patent application Ser. No. 17/450,662 filed Oct. 12, 2021 entitled Sprinkler With Internal Compartments, which is a continuation of U.S. patent application Ser. No. 16/742,760 filed Jan. 14, 2020 entitled Sprinkler With Internal Compartments (now U.S. Pat. No. 11,167,304 issued Nov. 9, 2021); which is a continuation of U.S. patent application Ser. No. 16/407,567 filed May 9, 2019 entitled Sprinkler With Internal Compartments (now U.S. Pat. No. 10,556,248 issued Feb. 11, 2020); which is a continuation of U.S. patent application Ser. No. 15/982,863 filed May 17, 2018 entitled Sprinkler With Internal Compartments (now U.S. Pat. No. 10,328,444 issued Jun. 25, 2019); which is a continuation of U.S. patent application Ser. No. 15/352,422 filed Nov. 15, 2016 entitled Sprinkler With Internal Compartments (now U.S. Pat. No. 9,987,649 issued Jun. 5, 2018); which is a continuation of U.S. patent application Ser. No. 14/280,113, filed May 16, 2014 entitled Sprinkler with Internal Compartments (now U.S. Pat. No. 9,539,602 issued Jan. 10, 2017); which claims priority to and benefit of U.S. Provisional Application Ser. No. 61/824,212 filed May 16, 2013 entitled Sprinkler with Internal Compartments, all of which are hereby incorporated herein by reference in their entireties.

BACKGROUND OF THE INVENTION

Sprinkler systems for turf irrigation are well known. Typical systems include a plurality of valves and sprinkler heads in fluid communication with a water source, and a centralized controller connected to the water valves. At appropriate times the controller opens the normally closed valves to allow water to flow from the water source to the sprinkler heads. Water then issues from the sprinkler heads in predetermined fashion.

There are many different types of sprinkler heads, including above-the-ground heads and "pop-up" heads. Pop-up sprinklers, though generally more complicated and expensive than other types of sprinklers, are thought to be superior. There are several reasons for this. For example, a pop-up sprinkler's nozzle opening is typically covered when the sprinkler is not in use and is therefore less likely to be partially or completely plugged by debris or insects. Also, when not being used, a pop-up sprinkler is entirely below the surface and out of the way.

The typical pop-up sprinkler head includes a stationary body and a "riser" which extends vertically upward, or "pops up," when water is allowed to flow to the sprinkler. The riser is in the nature of a hollow tube which supports a nozzle at its upper end. When the normally-closed valve associated with a sprinkler opens to allow water to flow to the sprinkler, two things happen: (i) water pressure pushes against the riser to move it from its retracted to its fully extended position, and (ii) water flows axially upward through the riser, and the nozzle receives the axial flow from the riser and turns it radially to create a radial stream. A spring or other type of resilient element is interposed between the body and the riser to continuously urge the riser toward its retracted, subsurface, position, so that when water pressure is removed the riser assembly will immediately return to its retracted position.

The riser assembly of a pop-up or above-the-ground sprinkler head can remain rotationally stationary or can include a portion that rotates in continuous or oscillatory fashion to water a circular or partly circular area, respectively. More specifically, the riser of the typical rotary sprinkler includes a first portion (e.g. the riser), which does not rotate, and a second portion, (e.g. the nozzle assembly) which rotates relative to the first (non-rotating) portion.

The rotating portion of a rotary sprinkler riser typically carries a nozzle at its uppermost end. The nozzle throws at least one water stream outwardly to one side of the nozzle assembly. As the nozzle assembly rotates, the water stream travels or sweeps over the ground.

The non-rotating portion of a rotary sprinkler riser assembly typically includes a drive mechanism for rotating the nozzle. The drive mechanism generally includes a turbine and a transmission. The turbine is usually made with a series of angular vanes on a central rotating shaft that is actuated by a flow of fluid subject to pressure. The transmission consists of a reduction gear train that converts rotation of the turbine to rotation of the nozzle assembly at a speed slower than the speed of rotation of the turbine.

During use, as the initial inrush and pressurization of water enters the riser, it strikes against the vanes of the turbine causing rotation of the turbine and, in particular, the turbine shaft. Rotation of the turbine shaft, which extends into the drive housing, drives the reduction gear train that causes rotation of an output shaft located at the other end of the drive housing. Because the output shaft is attached to the nozzle assembly, the nozzle assembly is thereby rotated, but at a reduced speed that is determined by the amount of the reduction provided by the reduction gear train.

Another feature of many prior art sprinklers is the use of electrically actuated pilot valves which connect in-line with the irrigation water supply and a sprinkler, allowing the water flow to an individual sprinkler to be turned on or off, preferably from a distant central control system. Typically, these pilot valves are located partially or even completely outside the sprinkler body. Thus, when the pilot valve needs adjustment or replacement, a user must shut off the water supply leading to the pilot valve, dig around the sprinkler to find the pilot valve, replace the pilot valve, rebury it, then turn the water supply back on. Since the main water supply must be shut off, other sprinklers will not function during this time consuming repair and may interrupt preprogrammed watering cycles.

SUMMARY OF THE INVENTION

In one embodiment, the present invention is directed to a sprinkler having a compartment that surrounds its riser portion in an offset or asymmetrical configuration. More specifically, the distance of the compartments walls from those of the riser vary (i.e., increase or decrease) at different locations surrounding the riser. Put another way, the riser is closer to one side of the compartment than other sides of the compartment. This non-concentric configuration allows larger components to fit inside the compartment than would fit if the riser was symmetrically surrounded by the same size compartment.

In another aspect of the present invention, the compartment further comprises a check valve and a pressure receptacle that are located in proximity to each other to allow connection to each by a pilot valve. The check valve and pressure receptacle are also preferably shaped and oriented to allow the pilot valve to be upwardly removed from the compartment of the sprinkler. Preferably, the pressure receptacle is mechanically fastened over an injection-molded aperture into the riser cavity.

In another aspect of the present invention, the sprinkler includes a metal communication tube that is injection molded into a fin or rib extending away from a lower portion of the riser housing. Preferably, the communication tube is partially exposed near its lower end to help accommodate for warping or shrinking that is sometimes inherent in the injection molding process.

In another aspect of the present invention, the sprinkler cavity may include a wireless communication module. This module may be configured to communicate with a nearby sensor, such as a soil moisture sensor and relay data back to a central controller. This module may also be configured as a node in a mesh network.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
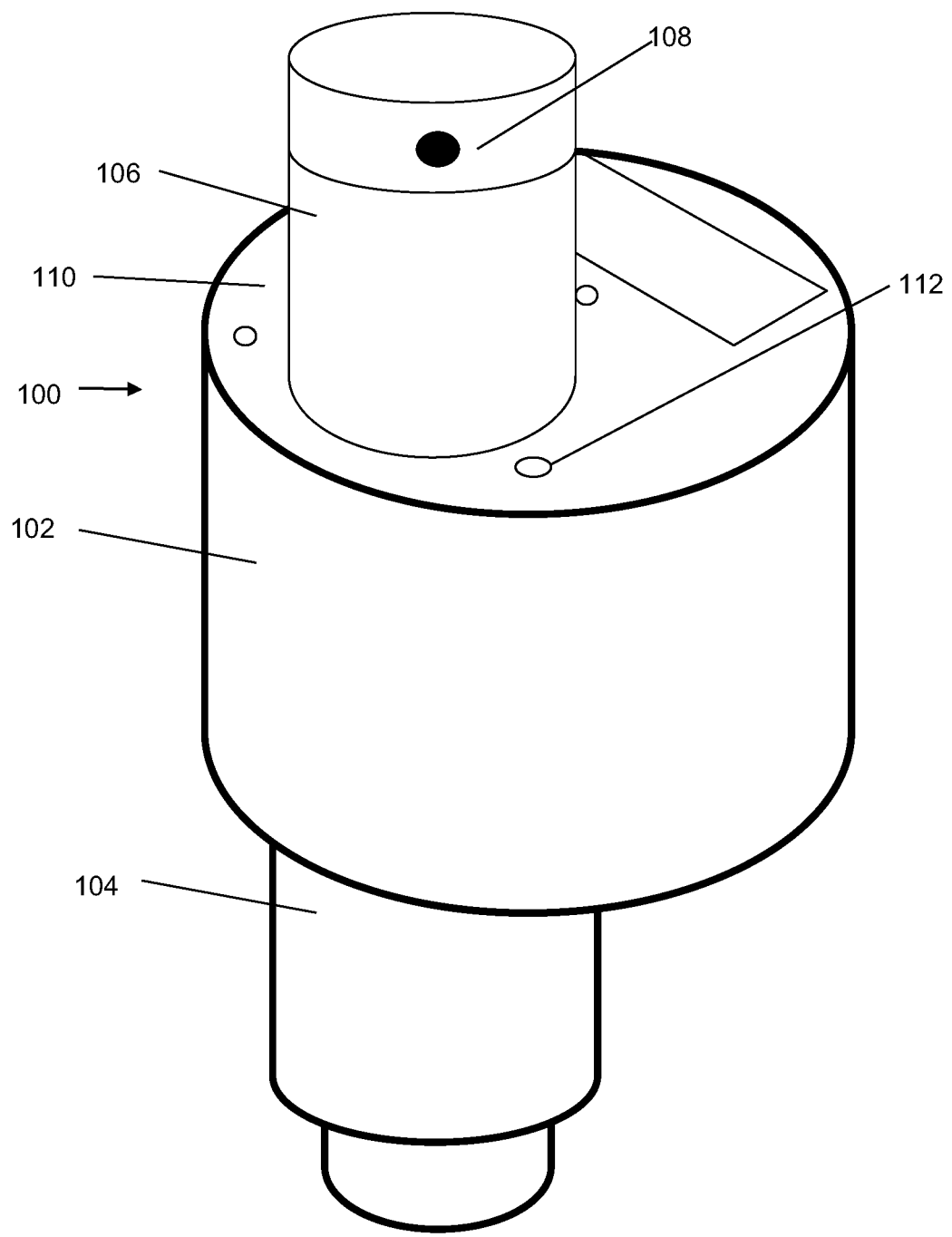
FIG. 1 illustrates a perspective view of a top accessible sprinkler according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

One embodiment of the present invention is directed to a sprinkler 100 having one or more internal compartments that are configured for storing various sprinkler components and allowing those components to be accessed through a top of the sprinkler 100. This allows a user to easily access and replace certain components within the sprinkler.

Figure 2:
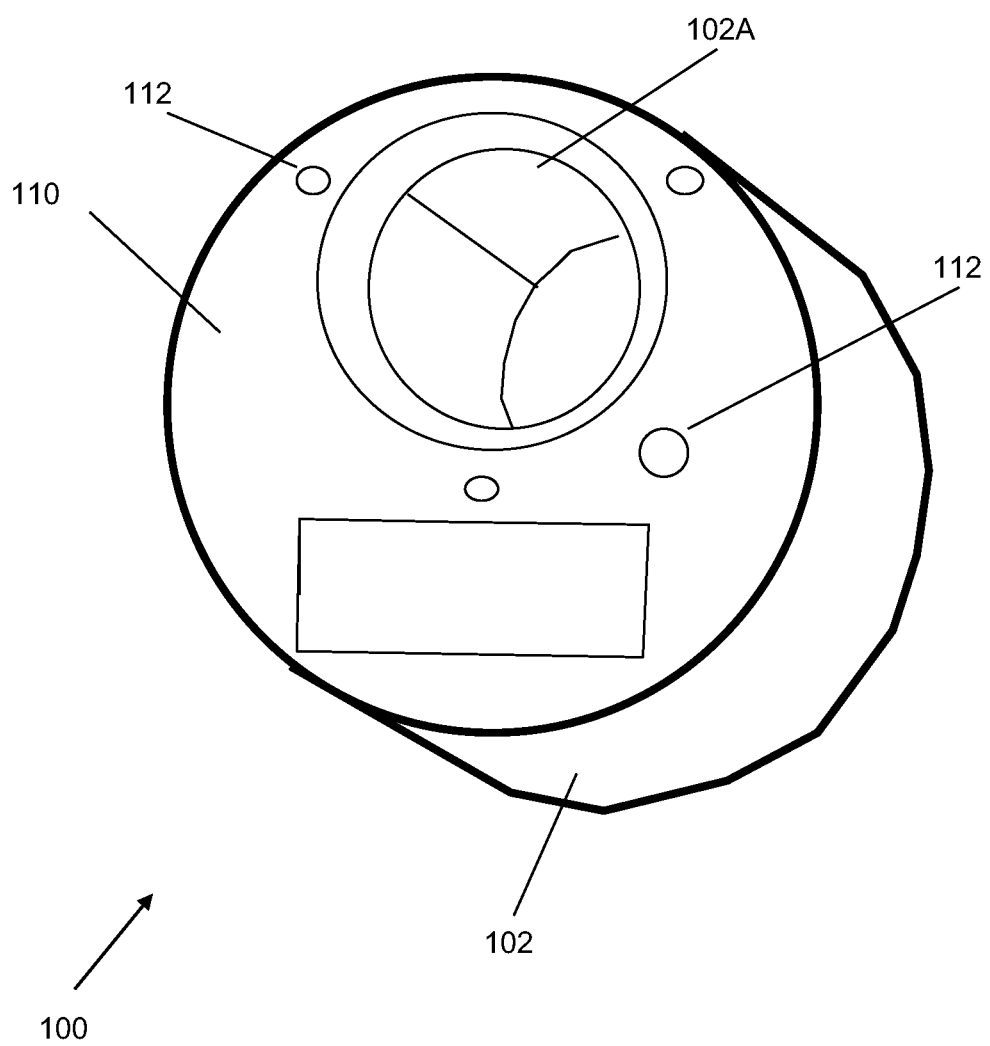
FIG. 2 illustrates a perspective view of a sprinkler compartment housing according to the present invention.
Figure 3:
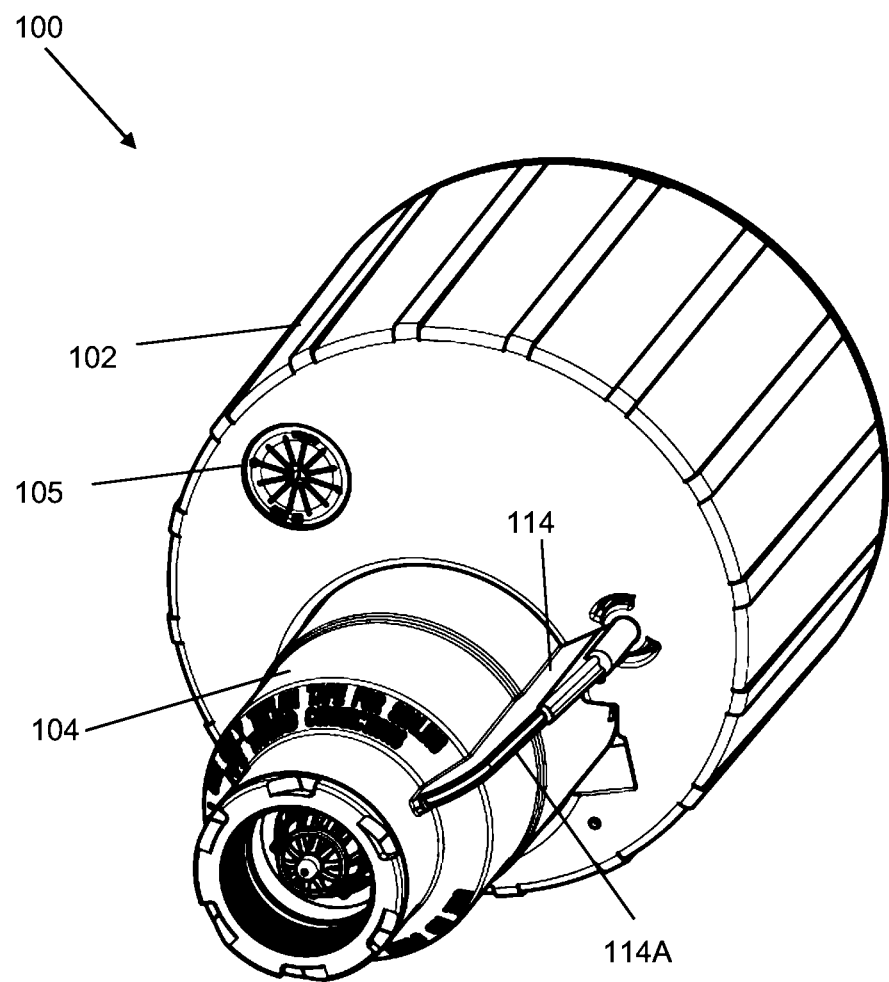
FIG. 3 illustrates a bottom perspective view of the sprinkler of FIG. 1.
Figure 4:
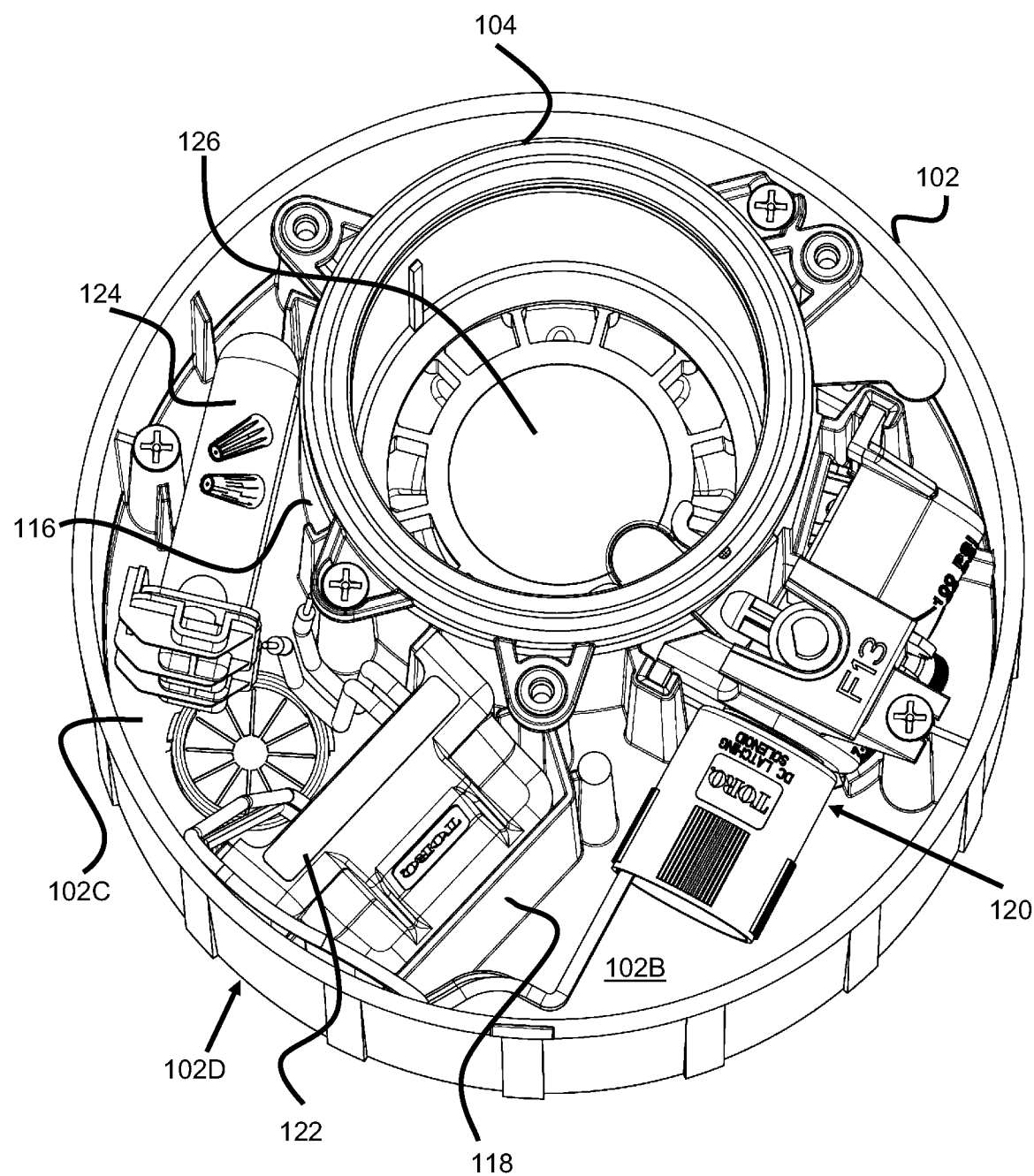
FIGS. 4 and 5 illustrate a top view of the sprinkler compartment according to the present invention.
Figure 5:
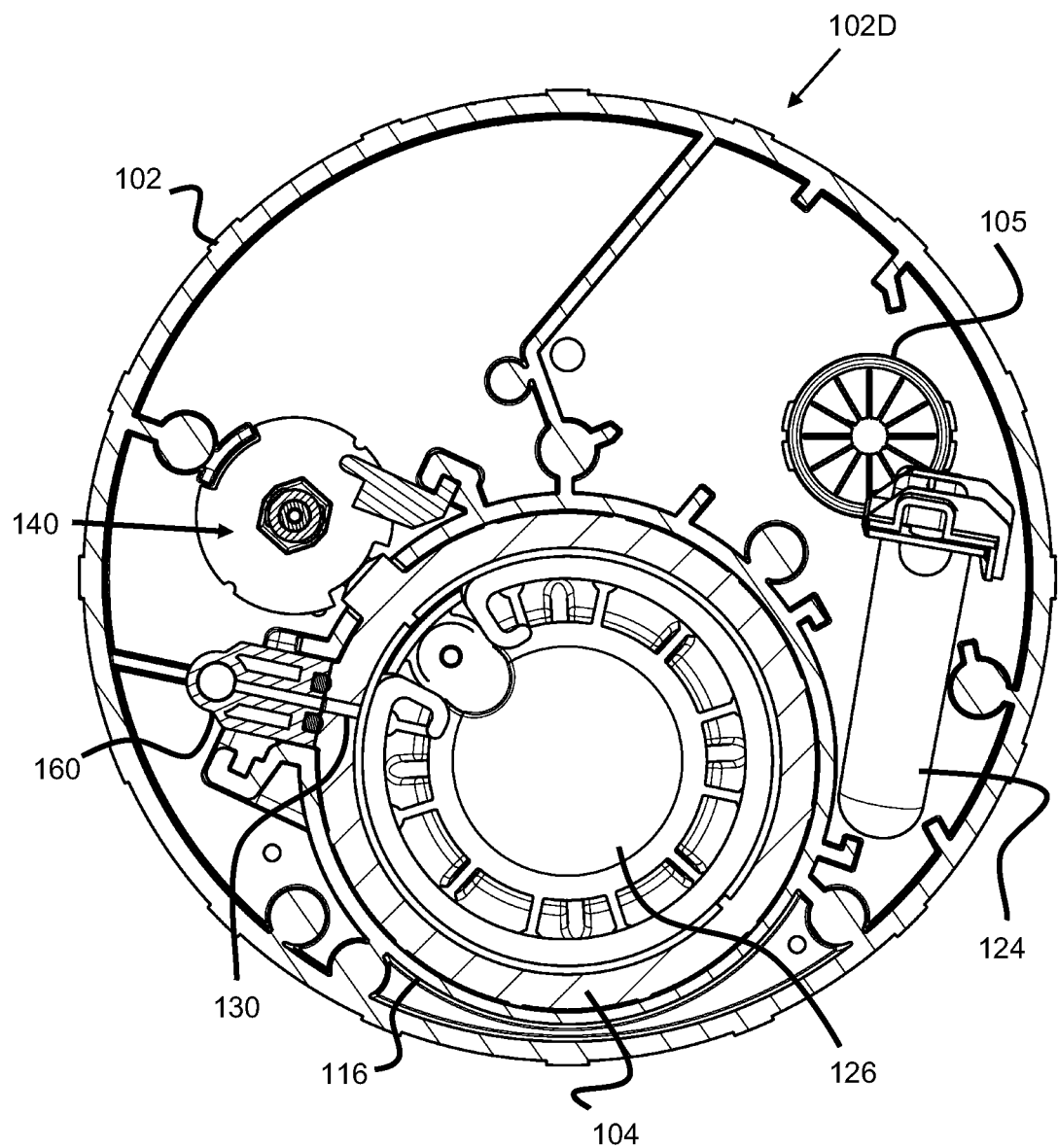

As seen best in FIGS. 1-3, the sprinkler 100 includes an outer housing 102 and a riser portion 106 with a rotating portion 108 (FIG. 1). The riser portion 106 has a cylindrical shape and is fixed within a tubular passage 102A of the outer housing 102. The tubular passage 102A is preferably offset from a center of the housing 102 or asymmetrically positioned relative to the outer walls of the housing 102. As best seen in FIGS. 4 and 5, the offset arrangement of the passage 102A creates an internal compartment area 102D that can accommodate larger components than would otherwise fit if the passage 102A was centrally located in the same diameter housing 102. For example, a pilot valve 120, decoder 122, and water-resistant wire connection tubes 124 can be located within the compartment area 102D.

The compartment area 102D can be divided into two or more distinct compartments (e.g., 2, 3, 4, or 5 compartments) with dividing walls. In the present embodiment, wall 118 creates compartments 102B and 102A, allowing components and wiring to be better separated from each other.

As seen in FIGS. 1-2, the sprinkler 100 preferably includes a cover 110 having a similar size and offset aperture placement as housing 102. The cover 110 can be a single component or can include multiple cover components (e.g., two) that can each be separately removed. Preferably, the cover 110 is secured in place via screws through apertures 112, however, other mechanisms of removably-securing the cover 110 to the housing 102 are also possible (e.g., latches or detents).

Preferably, the cover 110 includes an angled or tapered ring 110A (seen best in FIGS. 6 and 8), which fits against a reciprocally angled side surface 104B at the top of the riser housing 104. For example, the ring 110A increases its diameter in the downward direction while the side surface 104B has an oppositely angled surface that increases its diameter in the upward direction. This engagement allows the cover 110 to support the radial loads/stress in the riser housing 104 that might otherwise require support by an integral flange on the riser housing 104. The radial loads and stress in the riser housing 104 can result in fatigue failure at the riser snap ring groove without adequate support (e.g., due to the pop-up impact of the riser 106 that is transmitted through the riser snap ring every time the sprinkler turns on). Hence, the surfaces 110A and 104B allow the cover 110 to be removed easily (it is not pressed onto a straight diameter) and does not have a flange, partial flange, higher strength material requirement, or an additional part which might reduce access to the compartment and increase the cost to manufacture the sprinkler.

As seen in FIG. 4, the compartment area 102D may contain a pilot valve 120, a decoder 122, and wire connectors 124, each of which can be easily removed from the top of the sprinkler 100, as seen in FIG. 5 (components removed). However, as discussed elsewhere in this specification, other components may also be located within the compartment area 102D.

Figure 6:
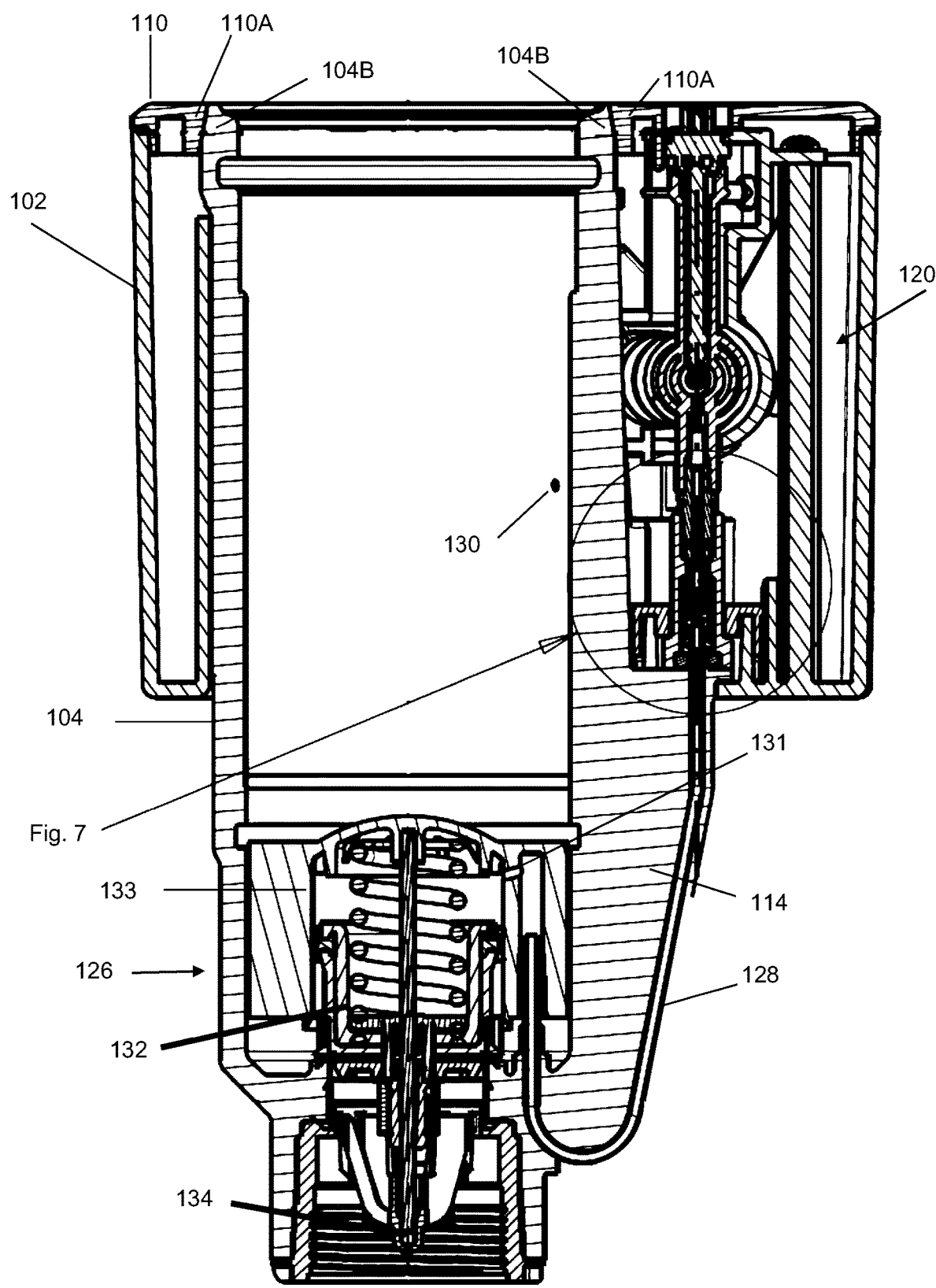
FIG. 6 illustrates a side cross sectional view of the sprinkler of FIG. 1.
Figure 7:
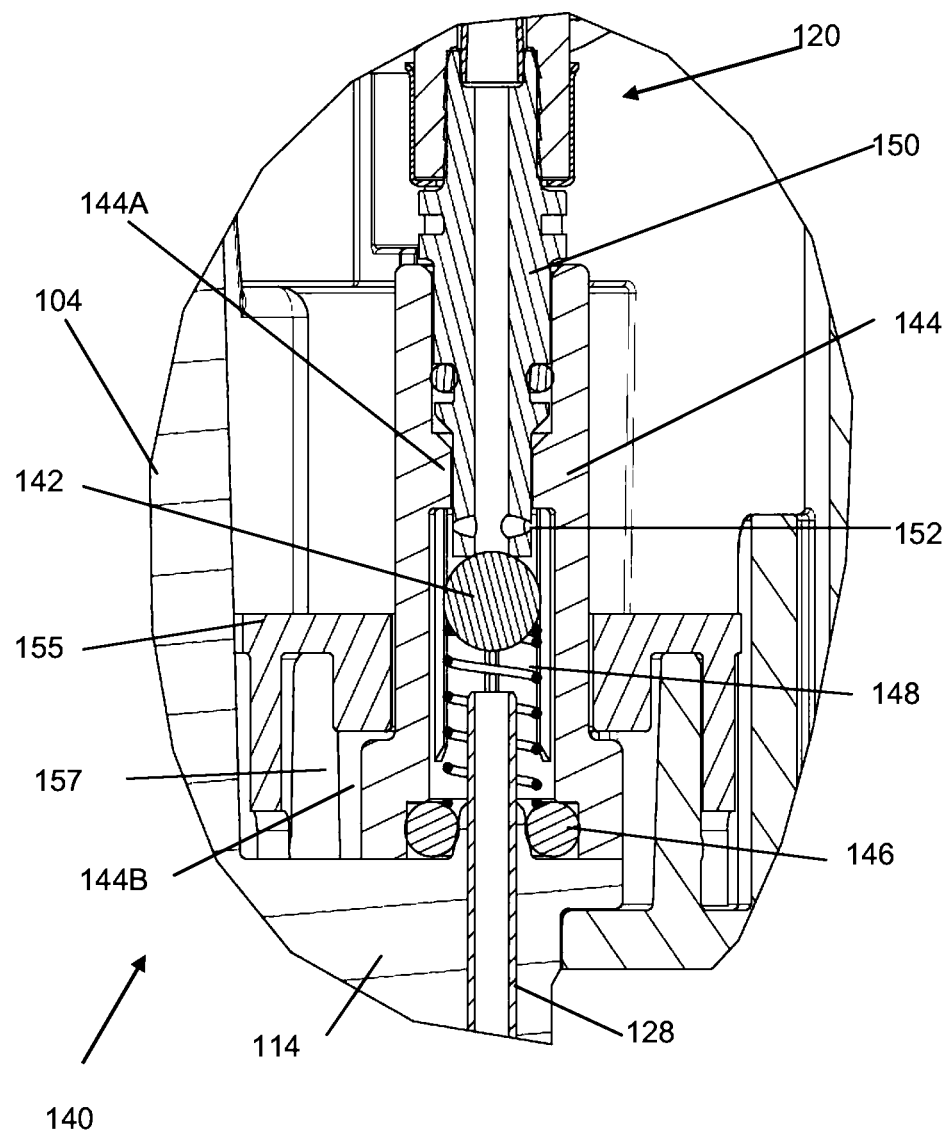
FIG. 7 illustrates a magnified view of the check valve of FIG. 6.
Figure 8:
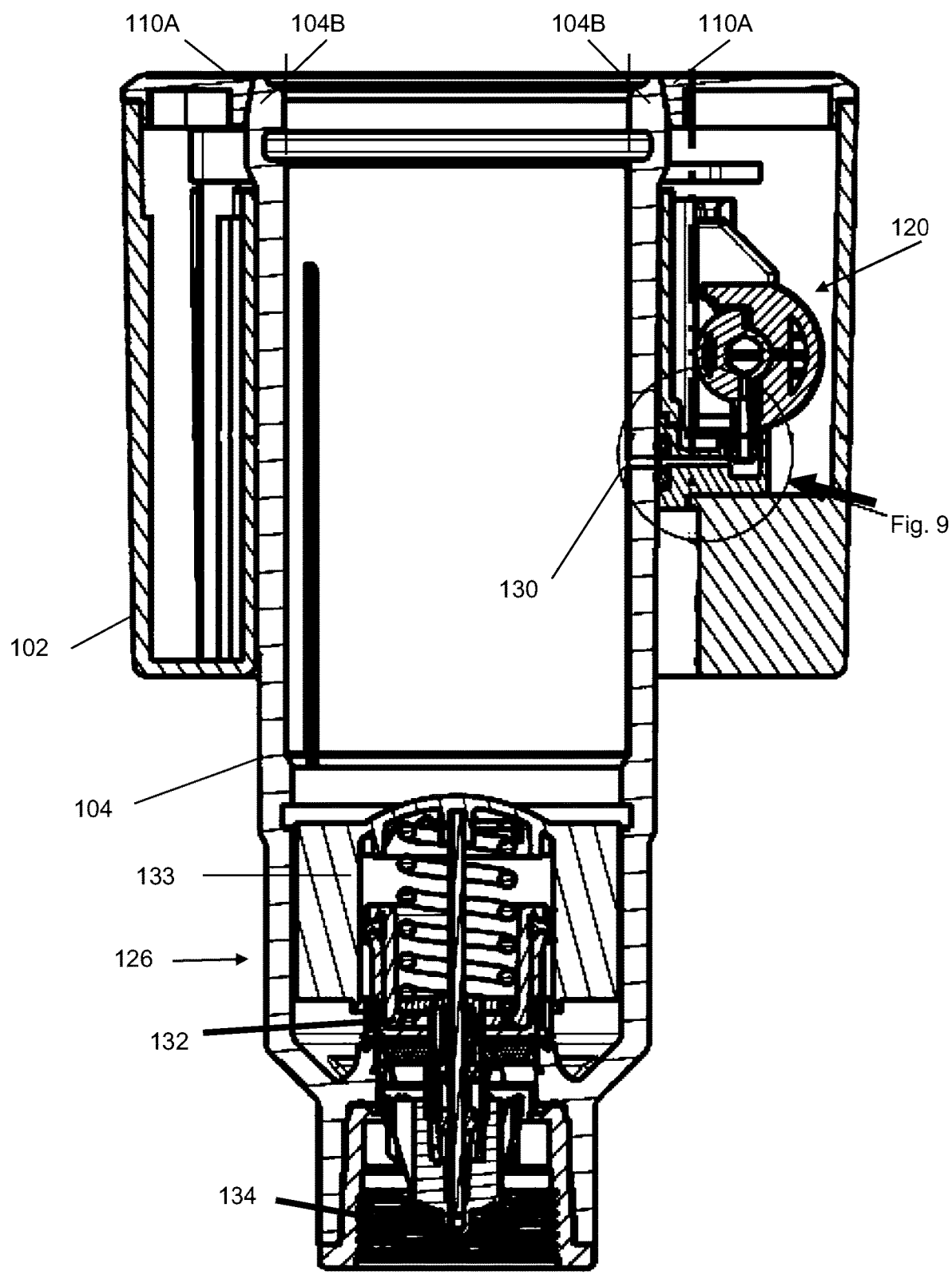
FIG. 8 illustrates a side cross sectional view of the sprinkler of FIG. 1.
Figure 9:
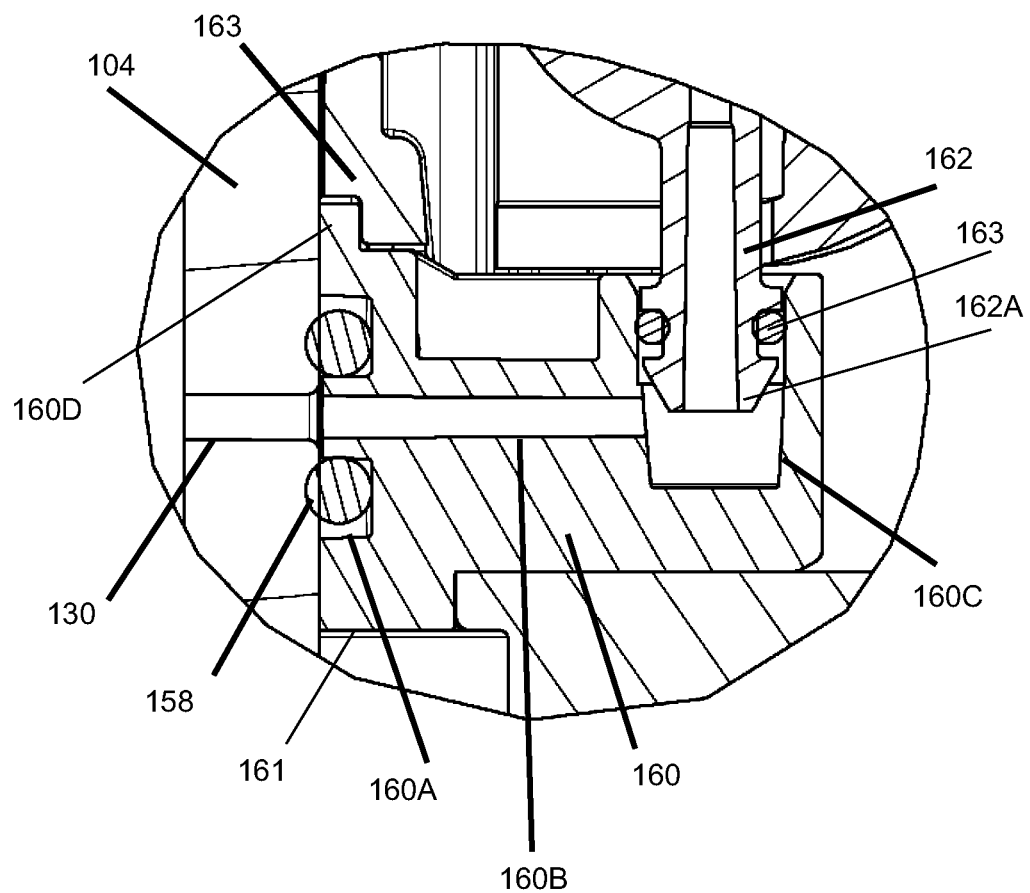
FIG. 9 illustrates a magnified view of a pilot valve connection port of FIG. 8.
Figure 10:
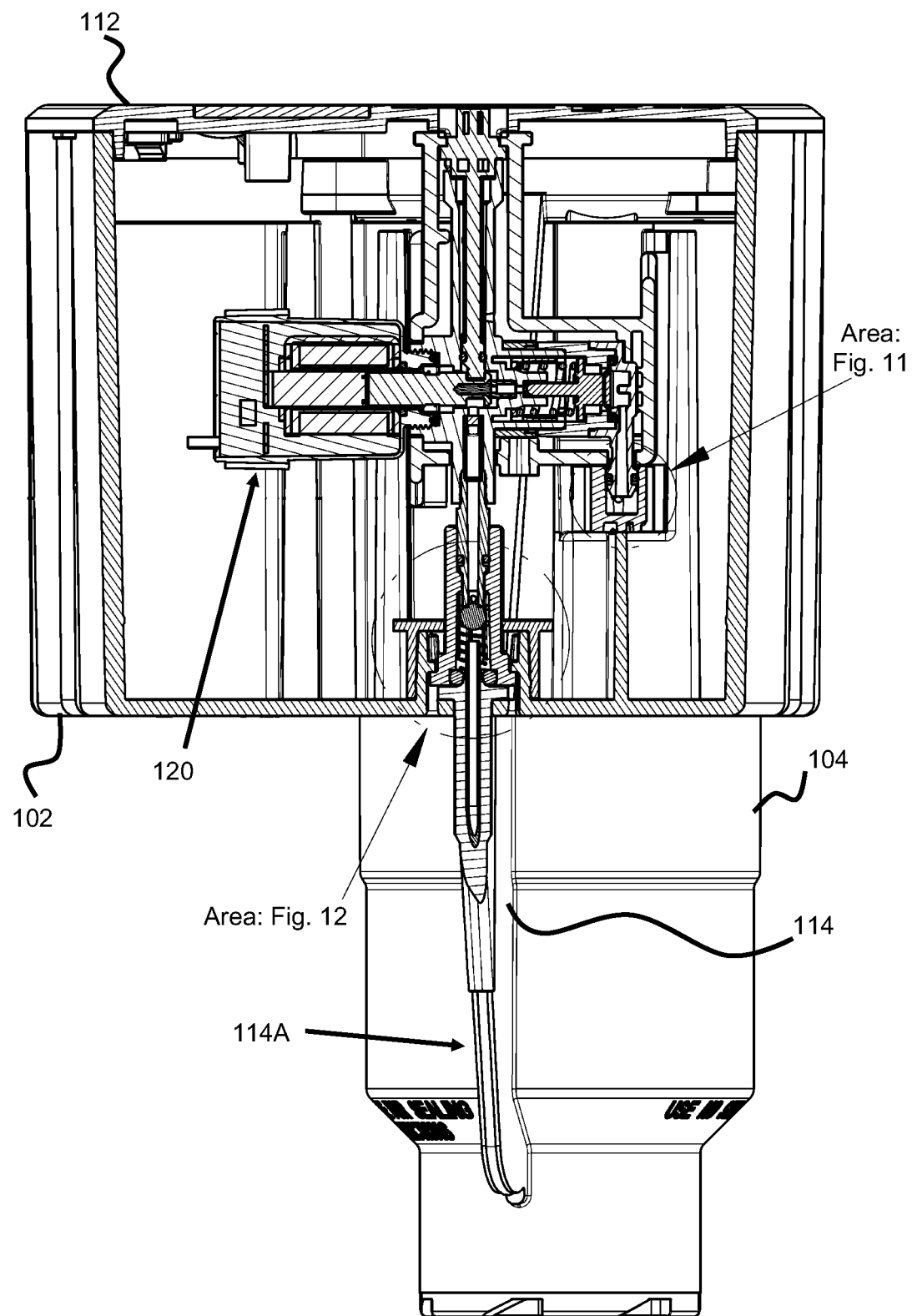
FIG. 10 illustrates a side cross sectional view of the sprinkler of FIG. 1.

The sprinkler 100 includes a valve assembly 126, seen best in FIGS. 6 and 8, which is controlled by the decoder 122 and pilot valve 120. The valve assembly 126 includes a metering pin 134 which allows a small amount of water to enter into valve chamber 133. As pressure builds in the valve chamber 133, it forces down a valve seat 132, maintaining the valve assembly 126 in a closed position.

The valve chamber 133 also includes a communication aperture 131 which connects to the communication tube 128. The tube 128 passes through the rigid outer fin 114 and into a bottom portion of the housing 102. As best seen in FIGS. 7, 12, 13, 14, and 18, the tube 128 is connected to a check valve 140 inside the compartment area 102D, which blocks flow of water through it until the first communication port 150 of the pilot valve 120 is connected to it. Preferably, a top of the tube 128 is positioned within the interior of the check valve 140.

The check valve 140 is maintained in a desired position in the compartment area 102D by a lower, circular-shaped wall 157 that is fixed to or unitary with the floor of the area 102D. An upper cylindrical retainer 155 is sized to fit over and around the wall 157, trapping an enlarged base portion or flanged region 144B of the check valve housing 144. The base portion 144B is also positioned over the end of the communication tube 128 and is further sealed between the base portion 144B and the base of the communication tube 128 by o-ring 146. In this respect, the check valve 140 can be removed and replaced by first removing the upper cylindrical retainer 155.

The valve mechanism within the check valve housing 144 comprises a spring 148 configured to push or bias a valve ball 142 upwards against a narrowed region 144A of the internal passage of the valve housing 144. The bottom surface of the narrowed region 144A forms a valve seat against which the valve ball 142 presses against, thereby stopping water flow. When the first communication port 150 of the pilot valve 120 is inserted into the top opening of the housing 144, it pushes the ball 142 downward, allowing water to flow through one or more side passages 152 into the port 150 (e.g., 1, 2, 3, or 4 side passages). In this respect, water can freely flow into the pilot valve 120. The water flow through the pilot valve is further controlled by movement of a plunger against a seat within a central fluid passageway inside the pilot valve 120. This plunger can be moved by either an attached electronic solenoid 170 or by turning a manual actuator (not shown).

Figure 11:
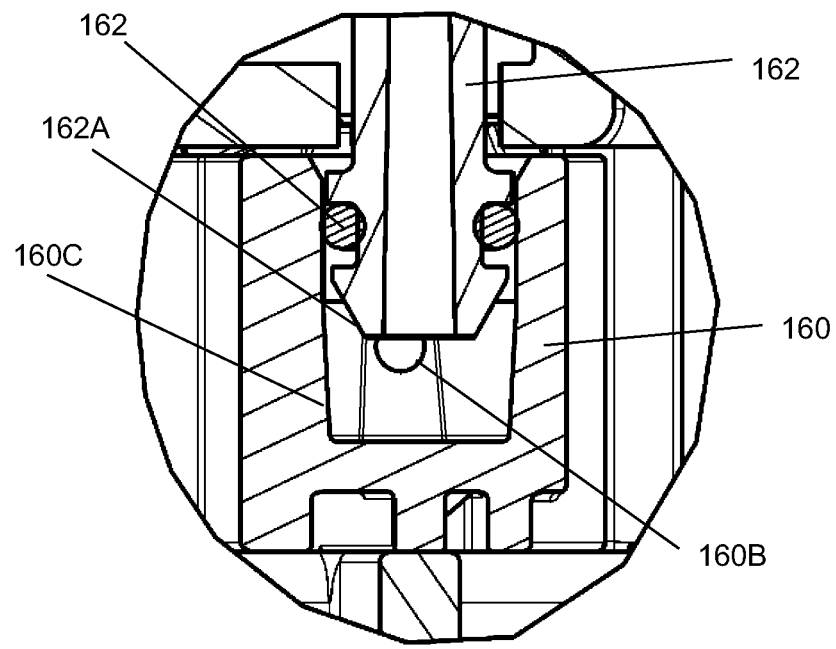
FIGS. 11 and 12 illustrates magnified views of portions of FIG. 10.
Figure 12:
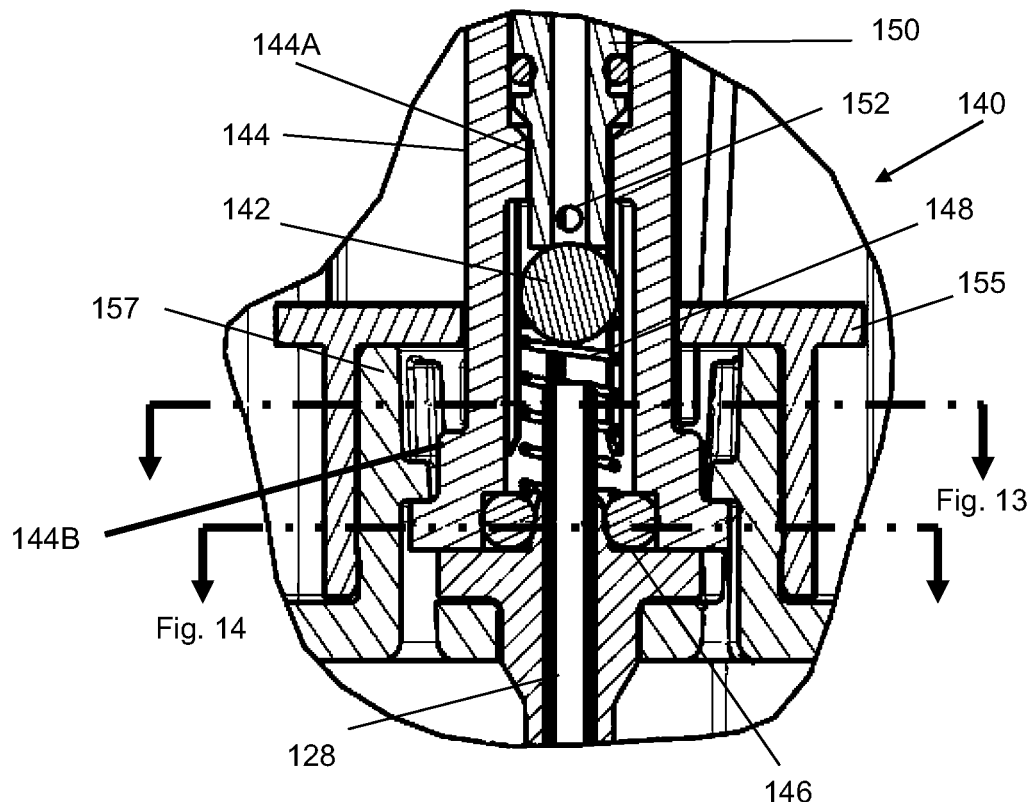
Figure 13:
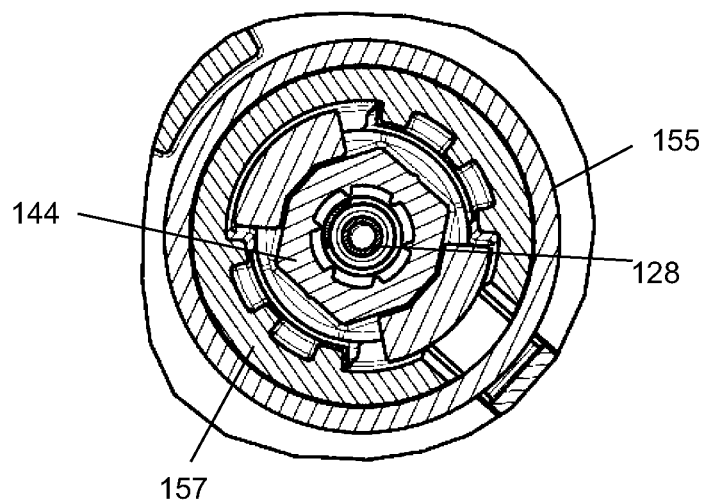
FIGS. 13 and 14 illustrates cross sectional views taken along the lines in FIG. 12.
Figure 14:
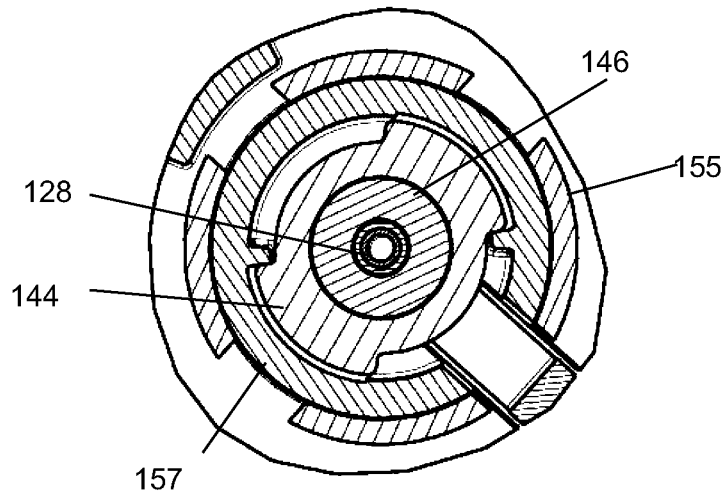

As seen in FIG. 11, the pilot valve 120 also includes a second communication port 162 through which water pressure can be communicated to the pilot valve 120 and relieved when the valve 126 is directed to be opened. As seen best in FIGS. 5, 9, 11, 15, 16, and 18, the second communication port 162 connects to a receptacle 160 which is in fluid communication with an interior of the sprinkler body or riser housing 104 (i.e., the passage in which the riser 106 moves upwards during irrigation and downwards when not irrigating).

Preferably, an aperture or passage 130 is molded into the wall of the riser housing 104 (i.e., is part of the injection mold) to maintain a relatively smooth inner surface of the riser passage of the housing 104. Drilling or otherwise puncturing the wall of the housing 104 after the interior passage is molded can result in small portions around the aperture 130 to protrude into the passage of housing 104, especially if the pilot valve 120 is configure to be screwed into this hole. Since the riser 106 includes a seal to prevent water leakage around the base of the riser 106 as it rises upwards during irrigation, any such protrusions or irregularities can damage this seal and/or can prevent the riser 106 from smoothly rising and falling.

The receptacle 160 preferably removably attaches to the outer surface of the wall of the riser housing 104. Specifically, the receptacle 160 includes an upper flange 160D that fits within a downwardly-facing gap created by retaining member 163. Similarly, the bottom portion of the receptacle 160 is sized to fit within a gap 161, thereby retaining the receptacle against the outer wall of the riser housing 104. Preferably, the retaining member 163 and gap 161 are positioned to align the inner receptacle passage 160B with the wall passage 130. To further maintain the seal between the receptacle 160 and the outer wall of the riser housing 104, the receptacle includes a recessed area around the end of passage 160B, which contains a resilient o-ring 158 that is compressed against the outer wall.

The inner receptacle passage 160B also connects to a cylindrical cavity 160C which is open at its top. The second communication port 162 is sized to fit within this cavity 160C, further connecting the passages 130, 160B to the passages of the pilot valve 120. To enhance the ease of connection and maintain a proper seal, the end of the second communication port 162 includes a tapered end 162A or nozzle and an o-ring 163.

Figure 15:
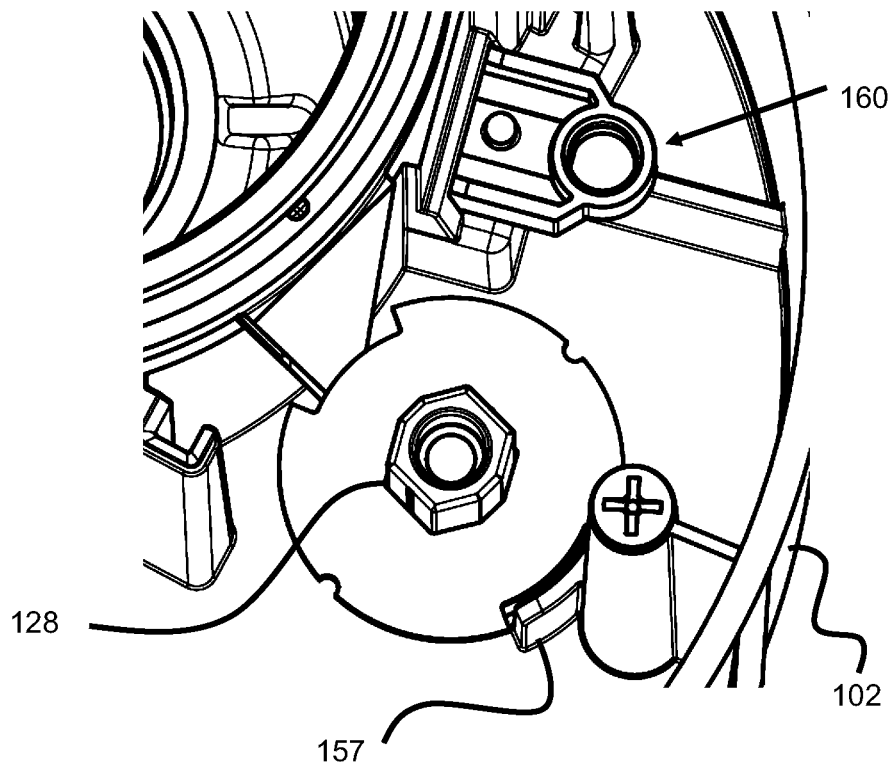
FIG. 15 illustrates a perspective view of an interior of the sprinkler compartment.
Figure 16:
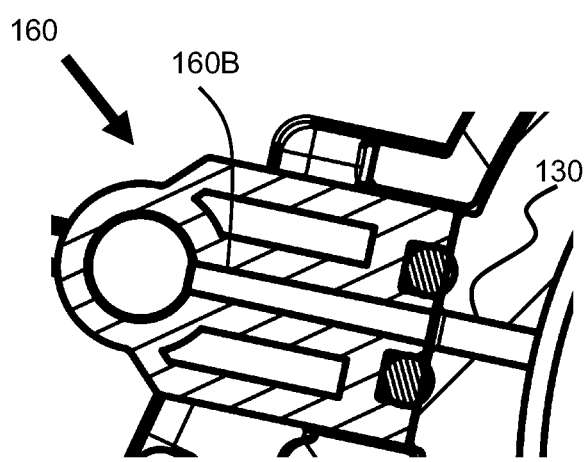
FIG. 16 illustrates a side perspective view of a pilot valve port.

It should be further noted that the check valve 140 and the receptacle are positioned within proximity of each other and preferably oriented in the same or similar direction (e.g., upwards), as seen in FIGS. 5 and 15. This spacing allows the first and second ports 150 and 162 of the pilot valve 120 to have similar spacing and an opposite orientation, allowing a user to easily remove the valve 120 (e.g., by simply pulling upwards on the valve 120) and easily installing a new valve 120 (e.g., by simply pushing a new valve 120 downwards). Hence, the pilot valve 120 can be quickly replaced from a top of the sprinkler 100.

The decoder 122, seen best in FIG. 4, communicates over a wire pair with an irrigation controller (e.g., such as a central irrigation controller or a satellite irrigation controller) and thereby selectively applies power to the solenoid 170 of the pilot valve 120, ultimately controlling irrigation of the valve. The wire pair enter the compartment area 102D via wire port 105 (seen best in FIG. 5) where they are connected to the wires of the decoder 122. Preferably, both sets of wires are each connected via an electrical wire nut 125, which is then further enclosed by a water-resistant tube 124 (see FIG. 4). The water-resistant tubes 124 are filled with a thick, hydrophobic material, such as grease, so as to prevent water contact with any exposed metal and further prevent corrosion. Hence, two water-resistant tubes 124 can be used between the wire of the decoder 111 and the controller's wire pair.

As best seen in FIGS. 4 and 5, the compartment area 102D preferably includes several vertical ridges that are sized to retain the decoder 122 when slid vertically down at a certain location within the compartment area 102D. Hence, a user can slide a decoder 122 in or out of the compartment area 102D from the top of the sprinkler 100.

Figure 17:
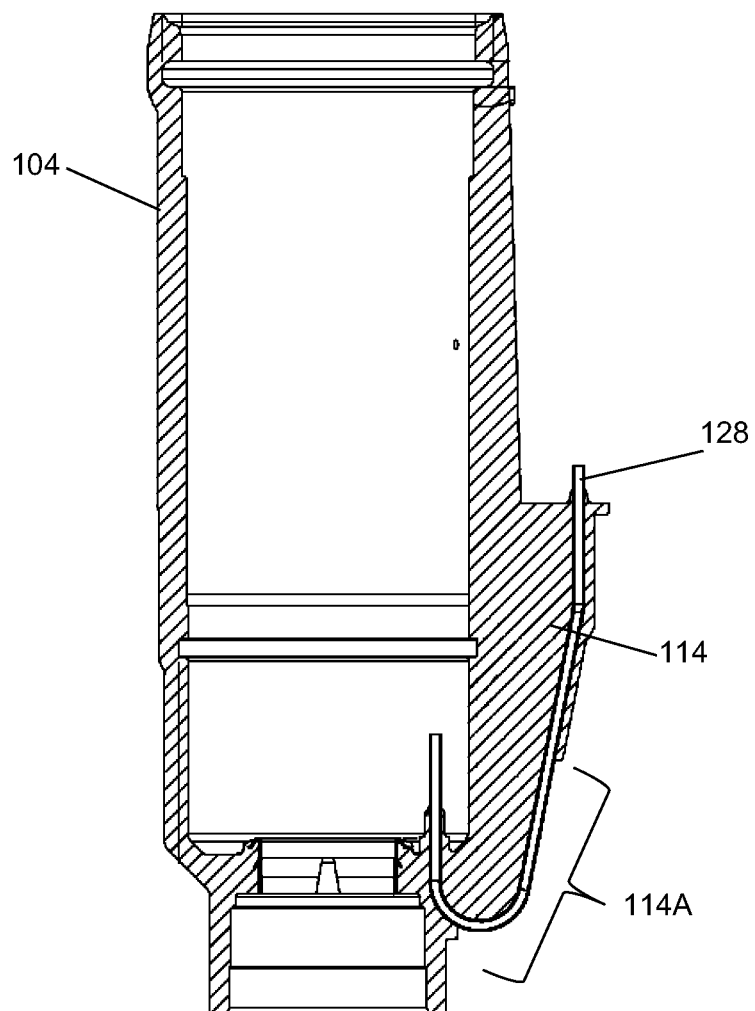
FIG. 17 illustrates a side cross sectional view of a portion of the sprinkler of FIG. 1.

Turning to FIG. 17, the riser housing 104 is preferably injection molded. Additionally, the fin portion 114 of the riser housing 104 preferably is molded around the communication tube 128, which is preferably composed of a metal, such as stainless steel. In this respect, the communication tube 128 can maintain a bent shape and yet still have substantially no gaps between its outer surface and the body of the riser housing 104. Preferably, the fin portion 114 also includes an open region 114A which exposes a portion of the communication tube 128. This open region 114A may help prevent or limit unwanted shrinkage or warping that is sometimes inherent in the injection molding process. Additionally, the open region 114A allows the tube 128 to be directly supported by the injection mold against the high pressures of molten plastic during the injection molding process. Without such support, the tube 128 might otherwise bend or deform without providing substantially increased support, such as a stronger material or thicker walled tube. In an alternate embodiment, the open region 114A may be relatively small (e.g., less than an inch) or may extend to just below the bottom of outer housing 102. In another alternate embodiment, the communication tube 128 is connected to the fin portion 114 after the injection molding of the riser housing 104.

Figure 18:
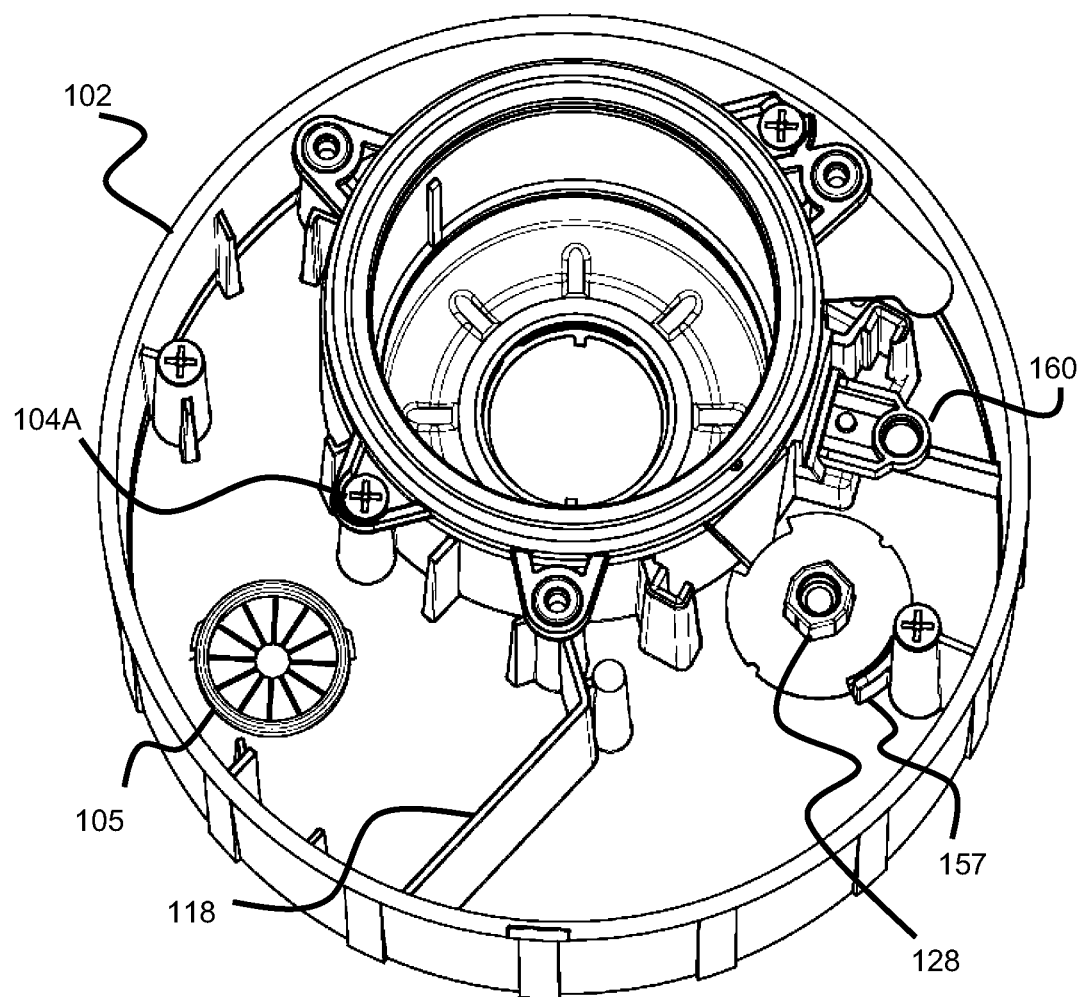
FIG. 18 illustrates a perspective view of the interior of the sprinkler compartment of FIGS. 4 and 5.

As seen in FIG. 18, the outer housing 102 is preferably connected to the riser passage housing 104 via a plurality of screws that pass through several radially-extending apertures 104A. In one alternate embodiment, the outer housing 102 can be optionally added to an existing riser 106 and riser housing 104, allowing users to upgrade existing sprinklers. In such an alternate embodiment, the apertures 104A may be part of an add-on ring that connects to an existing riser housing or may include other mechanical linking mechanisms, such as a clamp or latching mechanism.

Figure 19:
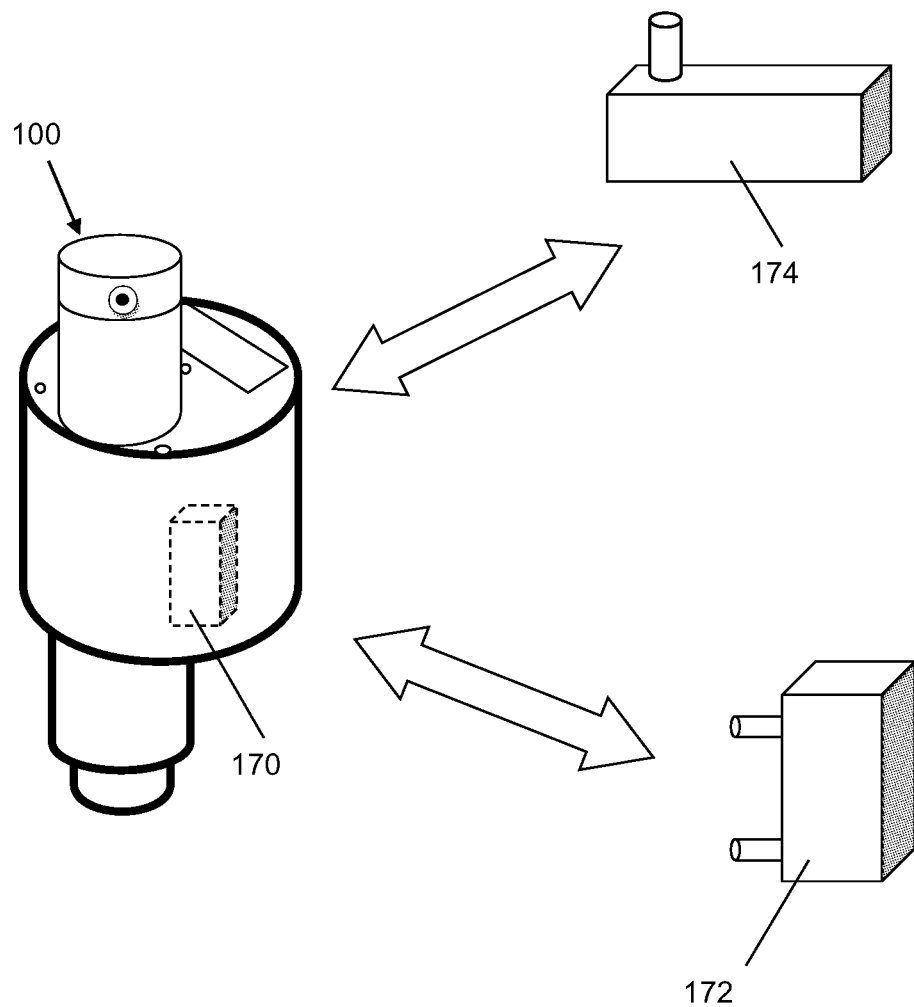
FIG. 19 illustrates a communication device for communicating with a sensor and relaying data over a network.

In one alternate embodiment shown in FIG. 19, the compartment of the sprinkler 100 may also contain a communication device 170 for communication with sensor 172. For example, the sensor may be a soil moisture sensor (e.g., the sensors of U.S. Pat. Nos. 7,719,432; 7,788,970; and 7,789,321; each of which are incorporated herein by reference); a weather station, or a rain sensor. The communication device 170 may include a wireless transmitter to wirelessly communicate with the sensor 172 and either wirelessly relay the data to network node 174 (which is either a repeater or gateway) or can relay the data via the decoder 122.

In one embodiment, a plurality of sprinklers, or even all sprinklers, may include their own communication device 170, forming a wireless mesh communication network. This network may relay command signals from a central irrigation controller, thereby eliminating the need for the two-wire decoder 122.

In another embodiment, the soil sensor 172 may be hard-wired to the sprinkler 100 and the communication device 170, allowing the sprinkler to power the sensor 172 and transmit its data.

In another example, the communication device 122 may wirelessly communicate with a remote control, allowing a user to send individual start/stop commands to each sprinkler 100 (e.g., for testing purposes). The communication device 122 would either directly control the pilot valve 120 or send control signals to the decoder 122.

In yet another example, device 170 may be any of the sensors described in U.S. Pub. No. 20120043395, which is hereby incorporated by reference. For example, the sensors may include an acoustic feedback sensor, an accelerometer, a gyroscope, a water sensor, a pressure sensor or a turbine. Each of these sensors can be configured to provide feedback as to whether the sprinkler's riser has "popped up" and is irrigating properly.

U.S. Pat. Nos. 7,631,813; 6,854,664; and 5,899,386 are hereby incorporated by reference.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation sprinkler comprising:
a sprinkler riser having an elevated position during irrigation and a lowered position when irrigation is stopped; the sprinkler riser comprising a rotating portion supporting a nozzle where the rotating portion rotates about a rotational axis; and,
a compartment including a radially inner wall and a radially outer wall, the radially inner wall and the radially outer wall each extending between a top and a bottom of the compartment, the compartment forming a compartment space extending at least partially around the sprinkler riser, the compartment space storing removable components of the irrigation sprinkler, wherein the radially outer wall is a curved portion of an outermost wall which extends entirely around the sprinkler riser so that the radially inner wall is asymmetrically spaced from the radially outer wall relative to the rotational axis; and wherein a first point along the outermost wall is located at a first radial distance from the sprinkler riser and a second point along the outermost wall is located at a second radial distance from the sprinkler riser, the second radial distance being less than the first radial distance;
wherein, along a plane perpendicular to the rotational axis of the rotating portion, the radially inner wall comprises a continuous uniform curvature that is different from a continuous uniform curvature of the radially outer wall such that the radially outer wall converges toward the radially inner wall and extends at least halfway around the rotational axis.

2. The sprinkler of claim 1, further comprising a wireless communication device located in the compartment; the wireless communication device establishing a wireless mesh communication network with other remote wireless communication devices within other sprinklers.

3. The sprinkler of claim 1, further comprising a check valve located in the compartment.

4. The sprinkler of claim 1, wherein the compartment is crescent shaped.

5. The sprinkler of claim 1, further comprising a plurality of wires located in the compartment.

6. The sprinkler of claim 1, further comprising a cover shaped to removably cover a top of the compartment.

7. The sprinkler of claim 1, wherein the compartment contains a pilot valve and a two-wire decoder that is connected to activate the pilot valve.

8. The sprinkler of claim 1, wherein the compartment further comprises a wire port located on a bottom surface of the compartment and opening outside of the sprinkler.

9. The sprinkler of claim 1, further comprising a communication tube extending from a bottom of the compartment to a main valve of the sprinkler.

10. An irrigation sprinkler comprising:
a sprinkler riser having an elevated position during irrigation and a lowered position when irrigation is stopped, the sprinkler riser comprising a rotating portion supporting a nozzle where the rotating portion rotates about a rotational axis;
a compartment that encompasses at least part of the sprinkler riser; where the compartment includes an outer wall and an inner wall each extending between a bottom of the compartment and a top of the compartment; wherein the outer wall is a curved portion of an outermost wall which extends entirely around the sprinkler riser;

wherein, along a plane perpendicular to the rotational axis of the rotating portion, the inner wall comprises a continuous uniform arc that is different from a continuous uniform arc of the outer wall such that the continuous uniform arc of the inner wall forms a lune shape with the continuous uniform arc of the outer wall; and wherein a first point along the outermost wall is located at a first radial distance from the sprinkler riser and a second point along the outermost wall is located at a second radial distance from the sprinkler riser, the second radial distance being less than the first radial distance; and, a compartment cover removably mountable over the compartment to cover the compartment.

11. The irrigation sprinkler of claim 10, wherein the compartment cover entirely surrounds a circumference of the riser.

12. The irrigation sprinkler of claim 10, wherein the compartment entirely surrounds a circumference of the riser.

13. The irrigation sprinkler of claim 10, wherein the compartment contains a removable check valve.

14. The irrigation sprinkler of claim 10, wherein the compartment contains a removable pilot valve.

15. The irrigation sprinkler of claim 10, wherein the compartment contains a removable two-wire decoder.

16. An irrigation sprinkler comprising:

a sprinkler riser that rises during irrigation and lowers when irrigation is stopped, the sprinkler riser comprising a rotating portion supporting a nozzle where the rotating portion rotates about a rotational axis; and, a compartment having a curved outer wall and a curved inner wall, wherein the curved inner wall converges toward the curved outer wall so that the compartment defines a lune shaped longitudinal cross-section; wherein the curved outer wall is a curved portion of an outermost wall which extends entirely around the sprinkler riser; and wherein a first point along the outermost wall is located at a first radial distance from the sprinkler riser and a second point along the outermost wall is located at a second radial distance from the sprinkler riser, the second radial distance being less than the first radial distance.

17. The sprinkler of claim 16, further comprising a removable two-wire decoder located within the compartment.

18. The sprinkler of claim 16, further comprising a communication tube located underneath the compartment and in communication with a valve within the compartment.

19. The sprinkler of claim 16, wherein the compartment includes an opening through a bottom floor of the compartment to an area outside of the irrigation sprinkler.

* * * * *